United States Patent
Holst

[19]

[11] Patent Number: 6,044,559
[45] Date of Patent: *Apr. 4, 2000

[54] CUTTING BLADE AND STABILIZING HANDLE ATTACHMENTS FOR A POWER DRILL

[76] Inventor: Mel Holst, 215 SW. 14th St., Gresham, Oreg. 97080

[ * ] Notice: This patent is subject to a terminal disclaimer.

[21] Appl. No.: 09/205,054

[22] Filed: Dec. 3, 1998

Related U.S. Application Data

[63] Continuation-in-part of application No. 08/829,498, Mar. 27, 1997, Pat. No. 5,870,827.

[51] Int. Cl.[7] ..................................................... B23F 3/00
[52] U.S. Cl. ................................ 30/122; 30/388; 30/500; 30/517; 408/20; 408/22
[58] Field of Search ............................. 30/122, 388, 500, 30/517, 514; 408/20, 22; 451/358, 442, 451

[56] References Cited

U.S. PATENT DOCUMENTS

| | | |
|---|---|---|
| 1,041,768 | 10/1912 | Frankofsky . |
| 1,425,152 | 8/1922 | Viers . |
| 1,850,137 | 3/1932 | Pursell ..................... 30/500 |
| 2,261,230 | 11/1941 | Cox et al. ................. 30/500 |
| 2,504,880 | 4/1950 | Rittenhouse ............... 408/20 |
| 2,544,461 | 3/1951 | Leitzel ..................... 30/500 |
| 2,555,048 | 5/1951 | Long ....................... 408/20 |
| 2,662,562 | 12/1953 | Lindell .................... 143/43 |
| 2,714,905 | 8/1955 | Clayton .................... 143/43 |
| 2,787,265 | 4/1957 | Neidt ...................... 143/43 |
| 2,982,320 | 5/1961 | Trumbull et al. ........... 143/43 |
| 3,009,497 | 11/1961 | Lorch ...................... 145/35 |
| 3,042,089 | 7/1962 | Lyons ..................... 143/159 |
| 3,510,989 | 5/1970 | Tolle ..................... 451/349 |
| 4,317,282 | 3/1982 | Pace ....................... 30/122 |
| 4,319,433 | 3/1982 | Nolan et al. .............. 451/358 |
| 4,972,589 | 11/1990 | Povleski ................... 30/500 |
| 5,371,977 | 12/1994 | Liner ..................... 451/349 |
| 5,692,574 | 12/1997 | Terada .................... 173/162.2 |
| 5,870,827 | 2/1999 | Holst ...................... 30/122 |

OTHER PUBLICATIONS

Product advertisement, Makita 3 3/8" Cordless Circular Saw (#5090D) dated at least as early as Dec. 9, 1996, 1 page.
Product advertisement, Makita 3 3/8" Cordless Cutter (#4190D) dated at least as early as Dec. 9, 1996, 1 page.

*Primary Examiner*—M. Rachuba
*Attorney, Agent, or Firm*—Chernoff, Vilhauer, McClung & Stenzel

[57] ABSTRACT

Attachments of the present invention are generally attached to a power drill that has a chuck with an axis of rotation. The attachments include a circular cutting blade attached perpendicularly to a shaft that is removably interconnected with the chuck and a stabilizing handle rotatably attached to and supporting the shaft between the drill chuck and the cutting blade. The stabilizing handle extends substantially transversely to the axis of rotation. The circular cutting blade may be a replaceable cutting blade or it may be integral with the shaft. The extension of the stabilizing handle may include a pivot and the gripping section if the stabilizing handle may include a hand guard. The stabilizing handle may also include a depth gauge mounted perpendicularly to both the shaft and the stabilizing handle. The stabilizing handle may also be two connected handle portions.

17 Claims, 3 Drawing Sheets

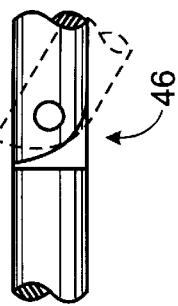
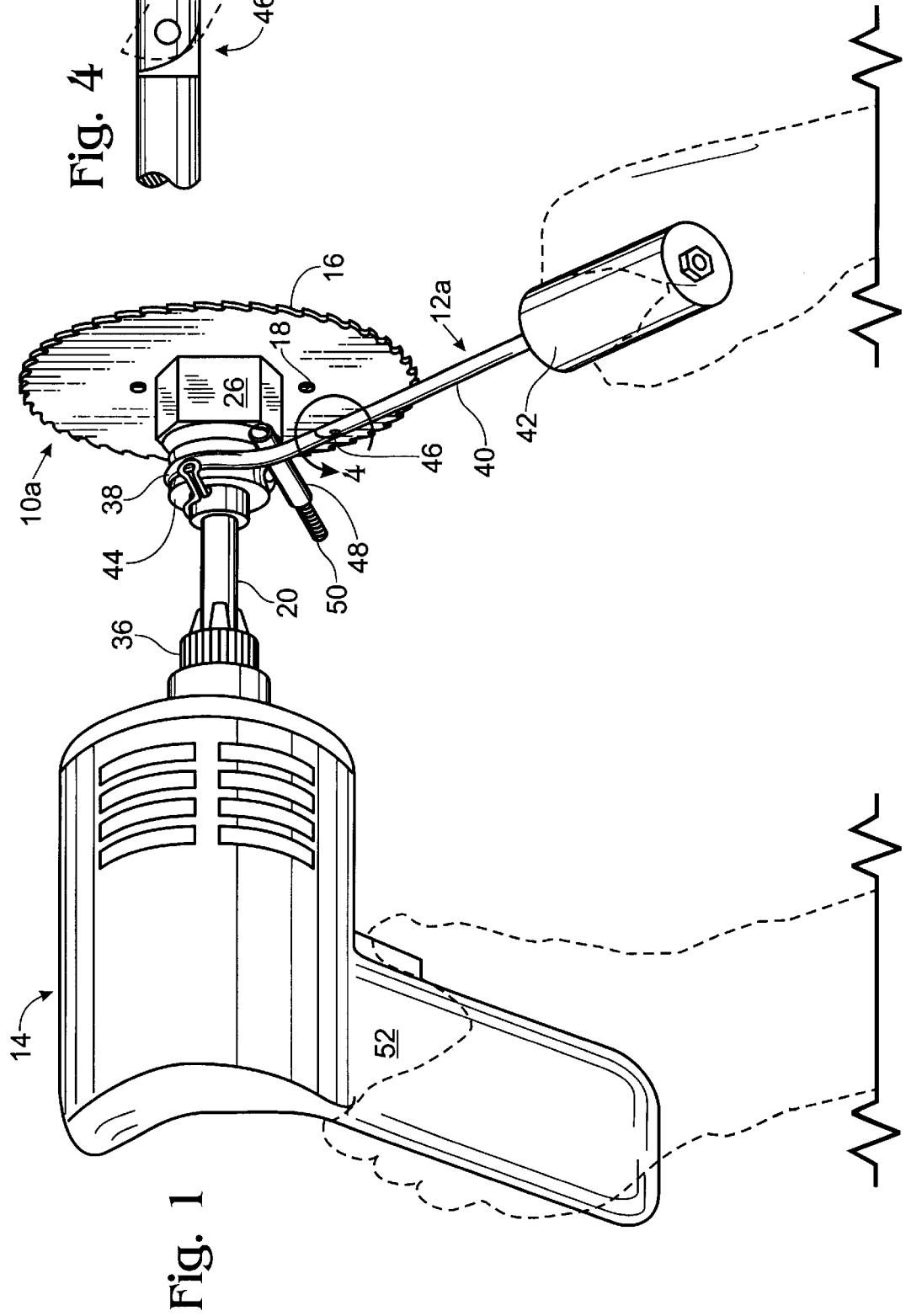

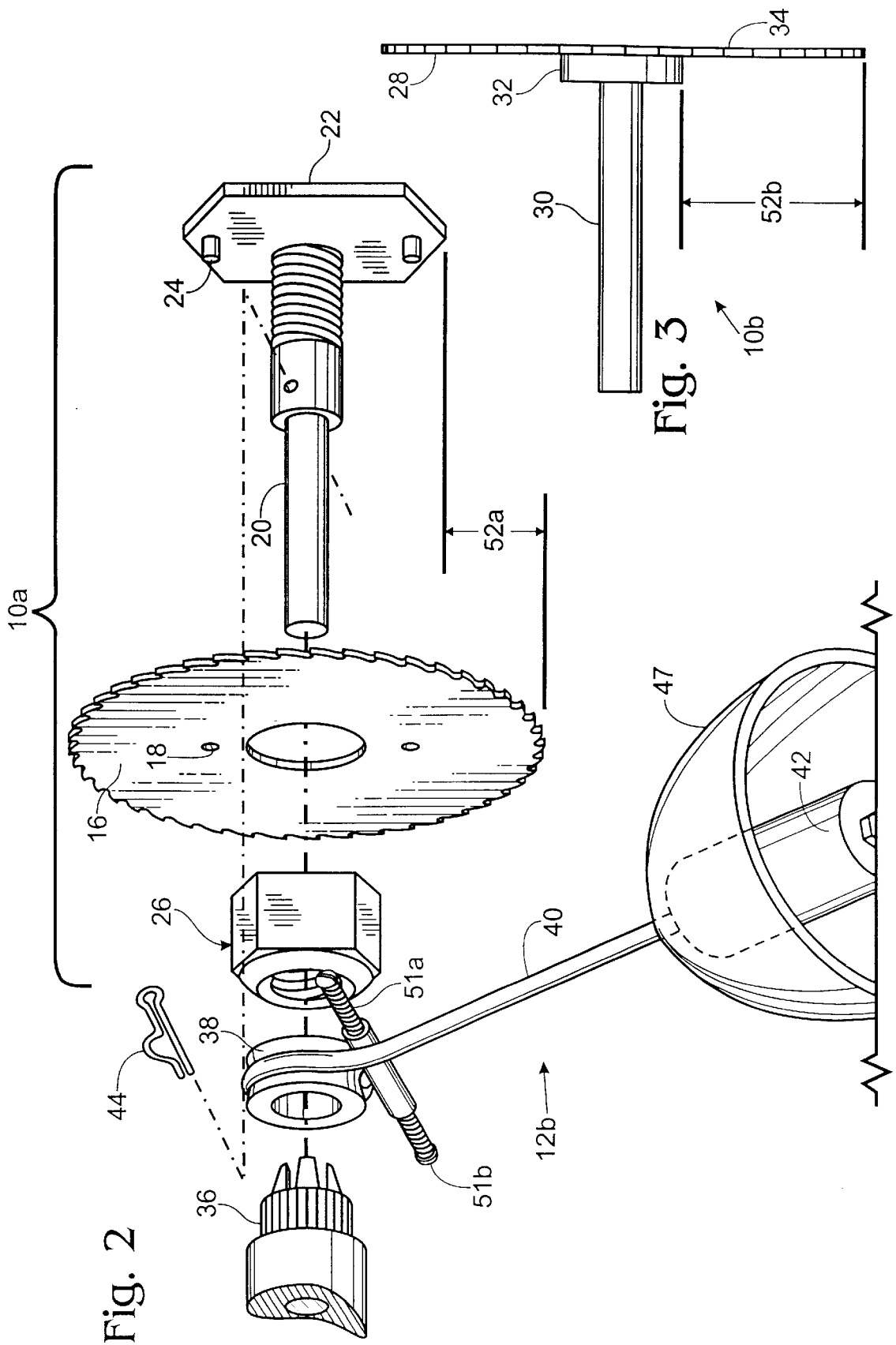

CUTTING BLADE AND STABILIZING HANDLE ATTACHMENTS FOR A POWER DRILL

This application is a continuation-in-part application of U.S. patent application Ser. No. 08/829,498, filed Mar. 27, 1997, now Pat. No. 5,870,827 entitled Sawblade and Stabilizing Handle Attachments for a Power Drill.

BACKGROUND OF THE INVENTION

The present invention relates to a cutting blade attachment and a stabilizing handle attachment for a power drill.

Removing a section of a wall or a ceiling can be done with such simple tools as a hammer, saw, or ax. These simple tools, however, are clumsy and inaccurate. Accordingly, modern electric tools have been developed that help to neatly cut straight lines. Because walls and ceilings are generally fixed in a specific position, generally these modern tools are small enough to be hand held. One such tool, a reciprocating saw includes a single straight blade that pulsates in and out of the wall as it cuts the wall. This motion is similar to the motion of a non-electric saw. Hand held circular saws tend to cut better than a reciprocating saw, but are often bulkier and, because of the guide plate that extends beyond the blade, cannot cut into corners.

The Makita Cordless Circular Saw #27385 and the Makita Cordless Cutter #27381 each have a circular sawblade that rotates. These saws, however, are too small to allow a user to use a second hand for stabilization. The small size, however, is directly proportional to the relatively small cutting capabilities to which this saw is suited due to its relatively weak battery and narrow blade. Also, the blade is essentially parallel to the handle. Such a configuration does not allow for ideal leverage.

Hand held circular saws such as those shown in Viers U.S. Pat. No. 1,425,152, and Lindell U.S. Pat. No. 2,662,562 show sawblade attachments for power drills. Like the Makita saw, the circular sawblades of these references are essentially parallel to their respective handles. Like the configuration of the Makita saw, this configuration does not allow for ideal leverage and stabilization despite having handles that allow a user to use two hands.

Liner U.S. Pat. No. 5,371,977 and Tolle U.S. Pat. No. 3,510,989 show abrasive wheel attachments for power drills that rotate about the drill chuck axis and have handles which extend transversely to the drill chuck axis. However, because these devices are not for cutting surfaces close to obstacles such as adjacent walls, the handles support the abrasive wheel axes at locations on the outer side of the wheels. Such a configuration would be unacceptable for a sawblade designed to cut close to a wall or other obstacle.

BRIEF SUMMARY OF THE INVENTION

None of the references show a cutting blade attachment for a power drill that makes it possible to cut a surface (such as a wall or ceiling) close to obstacles (such as a wall or ceiling) perpendicular to the cutting surface in conjunction with a stabilizing handle that provides leveraging and stabilization simultaneously while cutting. The present invention is able to do both.

The attachments of the present invention are generally attached to a power drill or other rotating apparatus that has a chuck with an axis of rotation. The attachments include a circular cutting blade attached perpendicularly to a shaft that is removably interconnected with the chuck and a stabilizing handle rotatably attached to and supporting the shaft between the chuck and the cutting blade. The stabilizing handle extends substantially transversely to the axis of rotation.

The circular cutting blade may be a replaceable cutting blade that has at least one hole that may be interconnected to at least one pin of an integral face plate of the shaft. Alternately, the circular cutting blade and the shaft may be an integral unit. Depending on the embodiment, the outer face of the circular cutting blade is flat or substantially flat.

The stabilizing handle may be divided into three sections: a shaft attachment bushing, an extension, and a gripping section. Preferably the shaft is journaled within the shaft attachment bushing. The extension may include an optional pivot. The gripping section may include an optional hand guard. The stabilizing handle may also include a depth gauge mounted perpendicularly to both the shaft and the stabilizing handle. The depth gauge may include one or two depth setters. An alternative stabilizing handle includes an external handle portion positioned over the external face of a cutting blade attachment.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a perspective view of one embodiment of the cutting blade attachment and the stabilizing attachment of the present invention in association with a drill.

FIG. 2 is an exploded view of the cutting blade attachment shown in FIG. 1 and an alternative embodiment of the stabilizing attachment.

FIG. 3 is an alternative embodiment of a cutting blade attachment.

FIG. 4 is an enlarged view of a pivot.

DETAILED DESCRIPTION OF THE PREFERRED EMBODIMENT

Figure 5:
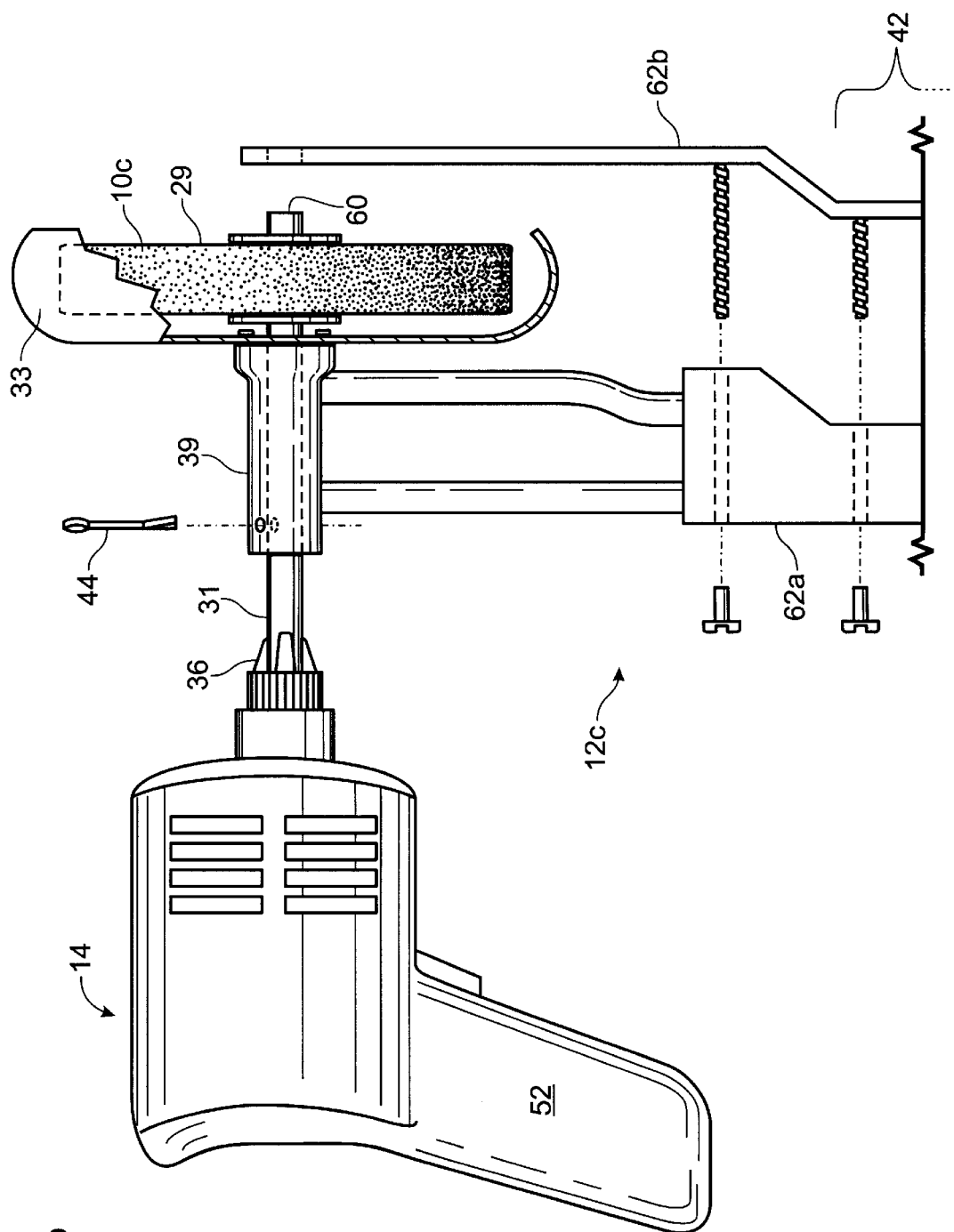
FIG. 5 is a perspective side view of an alternative preferred embodiment of a cutting blade attachment and an alternative preferred embodiment of a stabilizing handle attachment of the present invention in association with a drill.

FIG. 1 shows exemplary embodiments of a circular cutting blade attachment 10a (shown in an expanded view in FIG. 2) and a stabilizing handle attachment 12a for a power drill 14. FIG. 3 shows an alternative embodiment of the circular cutting blade attachment 10b. FIG. 2 shows an alternative embodiment of the stabilizing handle attachment 12b. FIG. 5 shows alternative embodiments of the cutting blade attachment 10a and the stabilizing handle attachment 12c.

The circular cutting blade attachment 10a shown in FIGS. 1 and 2 includes a replaceable cutting blade 16 with at least one hole 18 and a removable shaft 20. The removable shaft 20 has an integral face plate 22 (FIG. 2) with at least one pin 24 for mating with the at least one hole 18 of the replaceable cutting blade 20. By associating the at least one pin 24 with the at least one hole 18 the replaceable cutting blade 16 is prevented from rotating freely on the removable shaft 20. A locking nut 26 or other securing apparatus is preferably used to secure the replaceable cutting blade 16 next to the face plate 22 of the removable shaft 20.

FIG. 3 shows an alternative embodiment of the circular cutting blade attachment 10b that includes an integrated cutting blade 28 and shaft 30. As shown, the cutting blade 28 and shaft 30 are interconnected by a heavy duty shoulder 32. In this embodiment the outer face 24 of the cutting blade 28 is flat and unobstructed. It should be noted that alternative methods could be used to attach the cutting blade 28 and the shaft 30, however, the outer face 34 of the cutting blade 28 should be essentially flat and unobstructed.

FIG. 5 shows yet another cutting blade attachment 10c. This cutting blade attachment 10c is a grinder 29 on a shaft 31. Cutting blades 16, 28, 31 are meant to be exemplary. Any circular cutting or grinding apparatus could be used. Examples of circular cutting tools include, but are not limited to, traditional tooth blades, continuous rim blades both with and without cuts, blades with grit edges, grinders, abrasive blades, wet and dry blades, hummer wheels, adhesive backed discs, and metal and masonry cutting blades.

With any embodiment of the cutting blade attachment, the cutting blade 16, 28, 31 rotates about the axis of rotation of the drill chuck 36. Further, the shaft 20, 30, 31 is insertable into a standard drill chuck 36. Accordingly, the shaft 20, 30, 31 has a diameter of approximately ¼ inches to ¾ inches where it mates with the drill chuck 36. It should be noted that the diameter could be adjusted for alternative chucks or other relating apparatus. Further, because the outer faces of both cutting blade attachment embodiments 10a, 10b have no protruding hubs, the cutting blades 16, 30 may be used in confined spaces for cutting rectilinear holes in cutting surfaces with adjacent obstacles.

FIG. 5 shows an exemplary optional shaft shield 33 attached to the stabilizing handle. The shown exemplary safety shield 33 is substantially C-shaped in cross section to fit over a cutting blade. The shown embodiment is semicircular so that it projects outward towards the user but leaves the opposite, cutting edge free to cut. The shown embodiment is preferably transparent to provide the user complete visibility. A similar safety shield could be used to cover the sawblades of FIGS. 1–3.

Generally, a stabilizing handle attachment 12a, 12b of the present invention is rotatably attached to the shaft 20, 30 of the cutting blade attachment 10a, 10b. The handle attachment 12a, 12b extends substantially transversely to the axis of rotation of the cutting blade attachment 10a, 10b and rotatably supports the cutting blade axis in the area between the cutting blade 16, 28 and the drill chuck 36. As shown, the handle attachment 12a, 12b has three parts: a shaft attachment bushing 38, an extension 40, and a gripping section 42.

The shaft 20, 30 is rotatably journaled within the bushing 38. The bushing 38 optionally may be held against the shoulder 32 or locking nut 26 by a cotter pin 44. Alternatively, the bushing 38 may be allowed to slide freely on the shaft 20, 30.

The extension 40 of the stabilizing handle attachment 12a shown in FIG. 1 includes an optional pivot 46 that assists the user in providing leverage. The pivot 46 may be any standard pivot, however, as shown in FIG. 4, the pivot 46 may be a slotted pivot of which one side is square and the other side is arced so that the stabilizing handle attachment 12a could pivot only in one direction. Alternatively, as shown in FIG. 2, the extension 40 of the stabilizing handle attachment 12b does not include a pivot.

The gripping section 42 of the stabilizing handle 12b shown in FIG. 2 has an additional optional hand guard 47. The hand guard 47 is preferably of transparent flexible plastic so that the user's visibility of the cutting area is not obstructed. Alternatively, the gripping section 42 of the stabilizing handle 12a shown in FIG. 1 does not include a hand guard.

The handle attachment 12a shown in FIG. 1 also includes a depth gauge 48 with a single depth setter (shown as screw 50). The depth gauge 48 is preferably mounted perpendicular to both the shaft 20, 30 and the handle 12a, 12b. The depth gauge 48, using the screw 50 as a guide, may be set at any level within the range 52a (FIG. 2), 52b (FIG. 3) defined by the point at which there is interference on the cutting blade and the bottom of the blade. If, as shown, the screw 50 is inserted so that the head of the screw 50 is towards the user, the farther the screw 50 is set in the depth gauge 48, the more shallow the cut the cutting blade 10a, 10b will be able to make. The converse would also be true. However, by using the single screw 50, the user would have to adjust the screw 50 almost every time the unit is turned, as will be described below.

FIG. 2 shows a depth gauge 48 with two depth setters (shown as screws 51a and 51b). As mentioned above, the depth gauge 48 is preferably mounted perpendicular to both the shaft 20, 30 and the handle 12a, 12b. The depth gauge 48, using the both screws 51a, 51b as guides, may be set at any level within the range 52a (FIG. 2), 52b (FIG. 3). Because two screws 51a and 51b are set, the user would not have to make adjustments when the unit is turned, as will be described below.

FIG. 5 shows an alternative two-part stabilizing handle 12c. In this embodiment, the outer or external face of the cutting blade attachment 10c has a slightly protruding hub 60. An internal handle portion 62a of the handle 12c is rotatably attached between the chuck 36 and the cutting blade 29. An external handle portion 62b of the handle 12c is rotatably attached to the protruding hub 60 and to the internal handle portion 62a. It should be noted that the protruding hub 60 is preferably relatively flat, being only of sufficient length to allow the external handle portion 62b to allow clearance for the blade 29. This relatively flat hub 60 would be particularly advantageous if the cutting blade 29 were to be used in confined spaces.

To assemble the device shown in FIG. 5, the internal portion 62a of the two-part handle 12c, along with the optional safety shield 33, is rotatably attached to the shaft 51 of the cutting blade 10c. This may be accomplished by sliding the shaft 31 through the alternative shaft attachment bushing 39 and optionally secured with a cotter pin 44. The external handle portion 62b may be attached to the internal handle portion 62a and, simultaneously, to the protruding hub 60. It should be noted that the shaft 31 may be inserted into the drill chuck 36 before or after the external handle portion 62b is attached to the internal handle portion 62a.

In use, the drill 14 is held by its handle 52 in one hand and the gripping section 42 is held in the other hand. This enables the user to advance the cutting blade 10a, 10b in a cutting direction while steadying the cutting blade against kickback. If a wall, ceiling, floor, or other obstacle is on the right side of the cutting surface, the user would hold the drill handle 52 in his left hand and the gripping section 42 in his right hand. If the user encounters an obstacle on the left (for example, if the user is cutting a rectangular section between two walls), the unit may be turned so that the user would hold the drill handle 52 in his right hand and the gripping section 42 in his left hand. Also, to prevent kickback, the direction of rotation of the cutting blade 10a, 10b is preferably changed.

It should be noted that the features discussed above can be interchanged to form additional embodiments. For example, an alternative stabilizing handle might have both a pivot and a hand guard. Another example is that the cutting blade attachments 10a, 10b, 10c may be used interchangeably with handles 12a, 12b, 12c or an alternative handle. Yet another example is that, by adding a hole in the shaft 30, a cotter pin 44 may be used to secure the bushing 38 against the shoulder 32. A safety shield 33 may be added to any embodiment.

The features shown may be modified without changing the scope of the invention. For example, the cutting blades 16, 28, 29 may have larger diameters than those shown to allow deeper cuts. Another example is that the depth gauge 48 and screws 50, 51a, 51b may be replaced with other apparatus that limits how deep the cutting blades 16, 28, 29 can cut. Still further, the cutting tool may be cordless or may use a cord, especially for longer and more difficult cutting jobs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. Attachments for a power drill having a drill chuck with an axis of rotation, said attachments comprising:
    (a) a circular cutting blade perpendicular to a shaft;
    (b) said shaft being interconnected with said drill chuck such that said cutting blade rotates about the axis of rotation; and
    (c) a stabilizing handle rotatably attached to and supporting said shaft between said drill chuck and said cutting blade, said stabilizing handle extending substantially transversely to the axis of rotation.

2. The attachments of claim 1 wherein said stabilizing handle has a shaft attachment bushing, an extension, and a gripping section.

3. The attachments of claim 2 wherein said extension is divided into two sections by a pivot.

4. The attachments of claim 2 wherein said gripping section has a hand guard.

5. The attachments of claim 2 wherein said extension has depth gauge.

6. The attachments of claim 1 wherein said stabilizing handle is a two-part stabilizing handle, said two-part stabilizing handle having an internal portion and an external portion.

7. The attachments of claim 6 further comprising a protruding hub, wherein said internal portion is rotatably attached to and supporting said shaft between said drill chuck and said cutting blade and said external portion is rotatably attached to said protruding hub.

8. The attachments of claim 1 wherein said cutting blade is a saw blade.

9. The attachments of claim 1 wherein said cutting blade is a grinding blade.

10. The attachments of claim 1 further comprising a safety shield attached to said handle.

11. A method for cutting a surface having obstacles at an angle thereto, said method comprising the steps of:
    (a) providing a power drill having a drill handle and a drill chuck with an axis of rotation;
    (b) providing a circular cutting blade perpendicular to a shaft;
    (c) rotatably attaching a stabilizing handle to said shaft;
    (d) removably interconnecting said shaft with said drill chuck such that said cutting blade rotates about the axis of rotation, said stabilizing handle is positioned between said cutting blade and said drill chuck, and said stabilizing handle extends substantially transversely to said axis of rotation;
    (e) gripping said drill handle in a first hand and said stabilizing handle in a second hand;
    (f) using said cutting blade to cut the surface; and
    (g) upon encountering said obstacles, gripping said drill handle in said second hand and said stabilizing handle in said first and using said cutting blade to cut the surface.

12. Attachments for a power drill having a drill chuck with an axis of rotation, said attachments comprising:
    (a) a circular cutting blade perpendicular to a shaft, said cutting blade having an outer radius;
    (b) said shaft being removably interconnected with said drill chuck such that said cutting blade rotates about the axis of rotation; and
    (c) a stabilizing handle rotatably attached to and supporting said shaft between said drill chuck and said cutting blade, said stabilizing handle extending substantially transversely to the axis of rotation, and said stabilizing handle extending beyond said outer radius of said cutting blade.

13. The attachments of claim 12 wherein said stabilizing handle is a two-part stabilizing handle, said two-part stabilizing handle having an internal portion and an external portion.

14. The attachments of claim 13 further comprising a protruding hub, wherein said internal portion is rotatably attached to and supporting said shaft between said drill chuck and said cutting blade and said external portion is rotatably attached to said protruding hub.

15. The attachments of claim 12 wherein said cutting blade is a saw blade.

16. The attachments of claim 12 wherein said cutting blade is a grinding blade.

17. The attachments of claim 12 further comprising a safety shield attached to said handle.

* * * * *

UNITED STATES PATENT AND TRADEMARK OFFICE
CERTIFICATE OF CORRECTION

PATENT NO. : 6,044,559
DATED : April 4, 2000
INVENTOR(S) : Mel Holst

Page 1 of 1

It is certified that error appears in the above-identified patent and that said Letters Patent is hereby corrected as shown below:

<u>Column 3,</u>
Line 2, change "lob" to -- 10b --.

Signed and Sealed this

Eighth Day of January, 2002

Attest:

*Attesting Officer*

JAMES E. ROGAN
*Director of the United States Patent and Trademark Office*